(12) United States Patent
Wedajo et al.

(10) Patent No.: US 10,079,979 B2
(45) Date of Patent: Sep. 18, 2018

(54) CAMERA ARRANGEMENT FOR A VEHICLE AND METHOD FOR CALIBRATING A CAMERA AND FOR OPERATING A CAMERA ARRANGEMENT

(75) Inventors: Brouk Wedajo, La Ferte Saint Aubin (FR); Yan Quelquejay, Ris Orangis (FR); Samia Ahiad, Gagny (FR); Julia Petit, Paris (FR); Caroline Robert-Landry, Paris (FR)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 1042 days.

(21) Appl. No.: 14/117,563

(22) PCT Filed: May 13, 2011

(86) PCT No.: PCT/EP2011/057786
§ 371 (c)(1),
(2), (4) Date: Sep. 5, 2014

(87) PCT Pub. No.: WO2012/155951
PCT Pub. Date: Nov. 22, 2012

(65) Prior Publication Data
US 2015/0109445 A1 Apr. 23, 2015

(51) Int. Cl.
*H04N 5/235* (2006.01)
*G01J 1/42* (2006.01)
(Continued)

(52) U.S. Cl.
CPC ............ *H04N 5/2351* (2013.01); *B60R 1/00* (2013.01); *G01J 1/4204* (2013.01); *G03B 7/08* (2013.01);
(Continued)

(58) Field of Classification Search
None
See application file for complete search history.

(56) References Cited

U.S. PATENT DOCUMENTS 7,447,581 B2 * 11/2008 Eberhardt .............. B60Q 1/085
180/167
2001/0018973 A1 9/2001 Chatterji et al.
(Continued)

FOREIGN PATENT DOCUMENTS

EP 1389878 A1 2/2004
EP 1530367 A1 5/2005
(Continued)

OTHER PUBLICATIONS

International Search Report issued in PCT/EP2011/057786 dated May 30, 2012 (5 pages).
(Continued)

*Primary Examiner* — Frederick D Bailey
(74) *Attorney, Agent, or Firm* — Osha Liang LLP

(57) ABSTRACT

The invention relates to a camera arrangement for a vehicle, comprising a camera (12), wherein by means of the camera arrangement a brightness of the surroundings of the camera is determinable. The camera arrangement comprises a storage device (38) in which is stored at least one brightness reference value (34) capturable by the camera. This reference value (34) is correlated with a corresponding value (36) indicative of a photometric quantity measurable by means of a photometer (14) at this brightness. An evaluation unit of the camera arrangement is designed for comparing a brightness value determined by the camera with the brightness reference value (34). Furthermore, the invention relates to a method for calibrating a camera (12) and for operating a camera arrangement.

12 Claims, 3 Drawing Sheets

Figure 1:
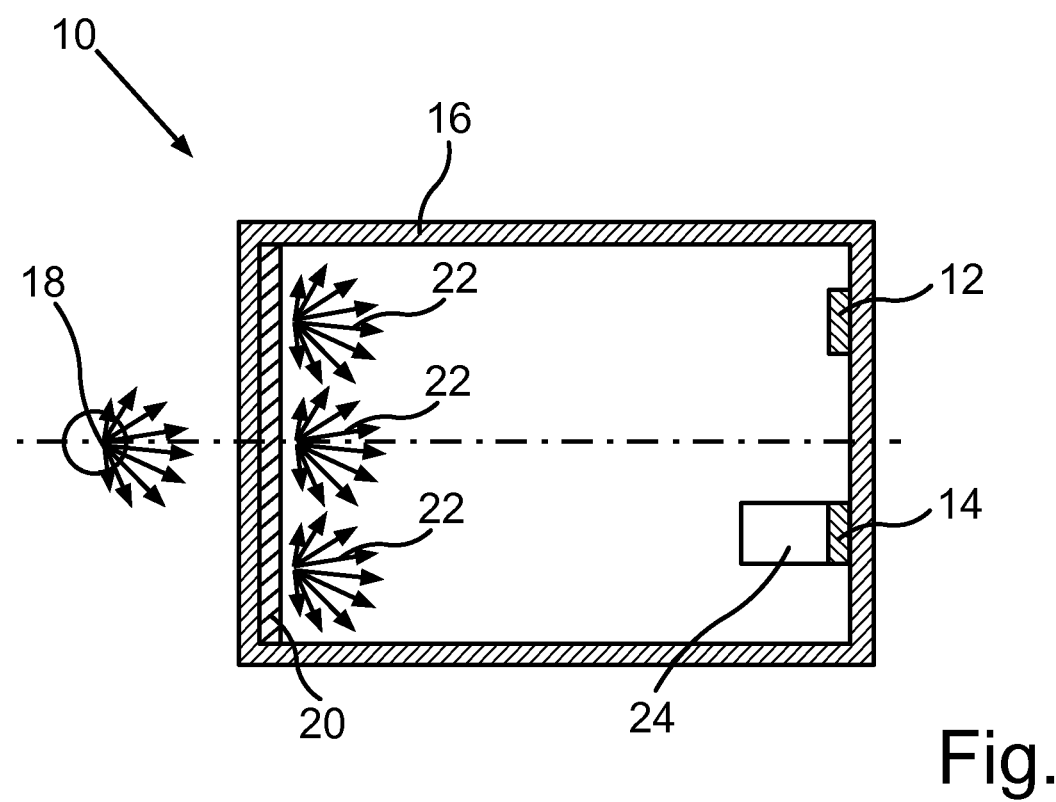

(51) Int. Cl.
*B60R 1/00* (2006.01)
*G03B 7/08* (2014.01)
*G03B 17/18* (2006.01)
*G03B 43/00* (2006.01)
*H04N 17/00* (2006.01)

(52) U.S. Cl.
CPC ............. *G03B 17/18* (2013.01); *G03B 43/00* (2013.01); *B60R 2300/402* (2013.01); *H04N 17/002* (2013.01)

(56) References Cited

U.S. PATENT DOCUMENTS

| | | | | |
|---|---|---|---|---|
| 2002/0138374 A1* | 9/2002 | Jennings | ................... | G06K 9/00 705/29 |
| 2004/0041905 A1* | 3/2004 | Shibayama | ........ | G06K 9/00771 348/47 |
| 2005/0055727 A1* | 3/2005 | Creamer | ............ | H04N 1/00214 725/105 |
| 2006/0008141 A1* | 1/2006 | Lin | ........................ | H04N 1/603 382/167 |
| 2006/0078199 A1* | 4/2006 | Bodnar | ..................... | G01J 3/02 382/168 |
| 2006/0140445 A1* | 6/2006 | Cusack, Jr. | ........ | G06K 9/00261 382/103 |
| 2007/0132873 A1* | 6/2007 | Hyodo | ................... | H04N 5/232 348/333.01 |
| 2009/0160937 A1 | 6/2009 | Son | | |
| 2009/0299684 A1 | 12/2009 | Imanishi et al. | | |
| 2011/0018967 A1* | 1/2011 | Mirbach | ................. | G01S 7/497 348/46 |
| 2011/0249086 A1* | 10/2011 | Guo | ....................... | H04N 7/147 348/14.12 |

FOREIGN PATENT DOCUMENTS

| | | |
|---|---|---|
| EP | 1 790 541 A2 | 5/2007 |
| EP | 2107413 A1 | 10/2009 |
| FR | 2783613 A1 | 3/2000 |
| GB | 877336 A * | 9/1959 |
| JP | 2009-146259 A | 7/2009 |

OTHER PUBLICATIONS

Written Opinion of the International Searching Authority issued in PCT/EP2011/057786 dated May 30, 2012 (7 pages).

* cited by examiner

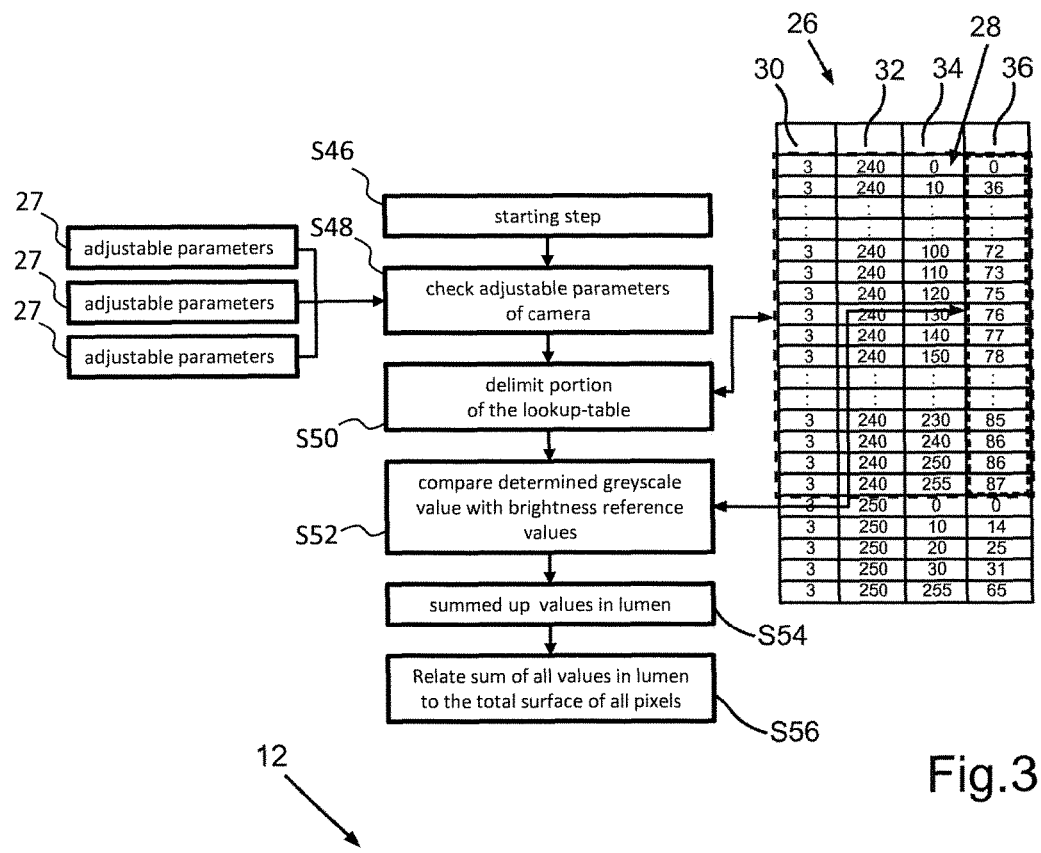
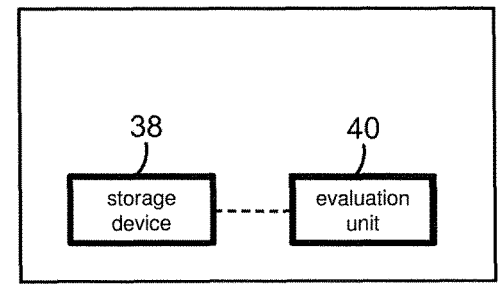
Fig.3
Fig.4

CAMERA ARRANGEMENT FOR A VEHICLE AND METHOD FOR CALIBRATING A CAMERA AND FOR OPERATING A CAMERA ARRANGEMENT

The invention relates to a camera arrangement for a vehicle, comprising a camera. By means of the camera arrangement the brightness of the surroundings of the camera can be determined. Furthermore, the invention relates to a method for calibrating a camera for a vehicle and to a method for operating a camera arrangement.

Document FR 2 783 613 A1 discloses a camera with four photometers for determining the brightness of an object which is captured by the camera when taking a picture of the object. The photometers comprise filters which ensure that the photometers record wavelengths of the radiation which are perceivable by the human eye.

It is known to use a camera with a picture sensor and with a photometer in a camera arrangement for a vehicle. The photometer records the brightness of the surroundings of the camera with brightness being the visual perception in which a source appears to be radiating or reflecting light. Thus it can, for example, be determined, if an area in front of the vehicle, the brightness of which is determined by the photometer, is a tunnel or not. If a tunnel is determined that way, corresponding functional units of the vehicle are activated. For instance the headlights may be switched on upon a tunnel coming within the capture range of the photometer.

Such a photometer used in a camera arrangement for a vehicle usually also comprises a wavelength filter which lets through only the wavelengths perceivable by the human eye. The photometric quantity which is measured by the photometer is normally given in Energy per square centimeter. In vehicles the photometer is also used to detect rain so that windscreen wipers of the vehicle can be activated accordingly. Also the headlights can be activated when darkness comes up, that is in dependence on the brightness determined by the photometer.

A camera known from the state of the art, which comprises a photometer is relatively complex.

It is therefore the task of the present invention to create a simplified camera arrangement of the afore-mentioned kind, a method for calibrating a camera and a simplified method for operating a camera arrangement for a vehicle.

This task is met by a camera arrangement with the features of claim 1, a calibration method with the features of claim 9, and a method for operating a camera arrangement with the features of claim 13. Advantageous embodiments with convenient further developments of the invention are indicated in the dependent claims.

According to the invention the camera arrangement for a vehicle comprises a camera for capturing a picture. By means of the camera arrangement a brightness of the surroundings of the camera can be determined. For that, the camera arrangement comprises a storage device in which at least one brightness reference value is stored. This reference value indicative of the brightness is correlated with a corresponding value, wherein the corresponding value indicates a photometric quantity which is measurable by a photometer at this brightness of the surroundings. Furthermore, the camera arrangement comprises an evaluation unit which is designed for comparing a brightness value determined by the camera with the brightness reference value. Thus, when operating the camera arrangement a brightness value determined by the camera is compared to the brightness reference value to which the corresponding value is assigned, while the corresponding value is indicative of the photometric quantity. Thus, the camera arrangement operates without a photometer. Brightness values determined by the camera can be directly used to indicate the brightness of the surroundings of the camera, which is usually determined by a photometer.

While the photometer, known from the state of the art, captures the wavelengths perceivable by the human eye, the camera captures a luminous flux the spectrum of wavelengths of which exceeds the spectrum which can be perceived by the human eye. This is because camera usually do not comprise a wavelength filter like the photometer. Thus, without prior calibration with the photometer the total luminous flux determined by the camera cannot directly be used for indicating the brightness that can be perceived by the human eye.

When operating the presently described camera arrangement the brightness value determined by the camera is compared to the reference value, to which the corresponding value measured by the photometer at the same brightness is assigned. For that, the camera is calibrated with the photometer beforehand. This calibration makes it possible to establish a correlation between the illuminance which the photometer indicates at a given the brightness and the value of brightness determined by the camera at the same brightness. Consequently there are values stored in the storage device, which correlate brightness values determined by the camera exposed to a certain luminous flux to values indicating the luminous flux as determined by a photometer.

The storage device can be integrated into the camera. Alternatively the storage device can be integrated into a control device which can be coupled with the camera, and which is a separate component in the vehicle. The evaluation unit can be integrated into the camera as well, or else provided outside of the camera, particularly in the control device.

In an advantageous embodiment of the invention the brightness which is determined by the camera arrangement takes into account brightness values determined per pixel in a picture captured by the camera. For this purpose the brightness values determined per pixel are assigned to the values indicating the corresponding photometric quantity through comparison with the brightness reference values stored in the storage device. The values indicating the photometric quantity can be summed up in order to obtain the luminous flux captured by all pixels of the camera. Since the size of a pixel is known as well as the number of pixels of the camera, the luminous flux per surface unit can be indicated in lux, as it is usually done by a photometer. The brightness value determined per pixel can be correlated very fast and easily with the value indicative of the photometric quantity.

In a further advantageous embodiment of the invention at least two brightness reference values are stored in the storage device, wherein the reference values correspond to different gamma values of the camera. Certain cameras used in vehicle applications allow the so called gamma correction to be varied by pre-setting a gamma value within a range of gamma values. The gamma correction transforms an input quantity into an output quantity according to a certain rule, in order to convert a physically proportionally growing quantity to a quantity which the human sense does not perceive as growing linearly. A low preset gamma value of the camera leads to a relatively fast saturation of the pixels of the camera when brightness increases. The gamma value thus also reflects the response dynamics of the camera. Therefore with different gamma values and corresponding reference values stored in the storage device, a particularly precise detection of the brightness can be carried out.

Alternatively, but preferably in addition, at least two brightness reference values are stored in the storage device, which correspond to different integration times of the camera. The integration time is the period of time during which a picture sensor of the camera accumulates charge carriers as the camera captures a picture. Storing different brightness reference values for different integration times is based on the finding that the luminous flux captured by the camera depends on the preset integration time. If the camera can be adjusted to different integration times, the consideration of the respective integration times allows for the determination of the brightness by utilization of the camera such as a photometer would do.

An particularly fast and easy assignment of brightness reference values capturable by the camera to the corresponding values indicating the photometric quantity can be achieved, if, according to another advantageous embodiment of the invention, a plurality of such reference values are stored in a lookup-table provided in the storage device.

In this case it has proven to be advantageous, if a portion of the lookup-table to be focussed on is pre-determined in dependence on a preset gamma value and/or on a preset integration time of the camera. Then not the whole lookup-table has to be scanned, but only the area of interest comprising the preset parameters. Thus the brightness can be determined particularly rapidly.

It is furthermore preferred, if the photometric quantity is indicative of a brightness which can be perceived by the human eye. Thus, the brightness determined by the camera can be used to activate functional units of the vehicle, which are to be activated in case of decreased brightness as sensed by humans. It is thereby possible to activate the headlights of the vehicle, either on entering a tunnel with the vehicle or when dawn is approaching or under particularly dark skies.

The at least one brightness reference value can be stored as a greyscale value. Such a greyscale value is readily available when a black and white camera is used. When using a digital colour camera (nowadays based on the use of an electronic sensor like CMOS or CCD) some conversion must be performed to determine greyscale values from the colour values. Different well known conversions exist and depend possibly on the image sensor used and/or the chosen weighting of the color channels.

Finally, an angle of view capturable by an objective of the camera is preferably chosen around 40° as of classical camera. But wider angle of view could be conceivable like wider than 90°.

In the method for calibrating a camera for a vehicle according to the invention the camera and a photometer are exposed to a light source. A photometric quantity indicative of the brightness of the light source is determined by means of the photometer. A brightness value determined by the camera is correlated as a brightness reference value with the photometric quantity determined at this brightness of the light source. The brightness reference value and the corresponding value are stored in a storage device. This calibration makes it possible to assign a brightness value determined by the camera to a brightness value as it would be determined by a photometer. It is thereby possible to refrain from providing a photometer in a vehicle, when using the camera arrangement comprising the camera and the storage device in order to determine the brightness of the camera's surroundings.

It is preferred to store a plurality of brightness reference values together with the corresponding values in a lookup-table provided in the storage device. This makes it possible to use the calibration results in a particularly easy manner.

In order to achieve a particularly reliable calibration, it is preferred to expose the camera and the photometer to the light source simultaneously.

Furthermore, it is advantageous that when calibrating the camera with the photometer the same angles of field are used. For the camera this can be achieved by using an objective lens, while an appropriate diaphragm can be provided for the photometer. It can thereby be assured that the luminous flux emanating from the light source reaches the light sensitive elements of the photometer and the camera in the same way.

In the method for operating a camera arrangement comprising a camera for a vehicle according to the invention, a brightness is determined by means of the camera arrangement. For that, a storage device of the camera arrangement is accessed, in which at least one brightness reference value is stored. The brightness reference value is correlated with a corresponding value which indicates a photometric quantity measured by a photometer. By means of an evaluation unit of the camera arrangement a brightness value determined by the camera is compared to the stored brightness reference value. Thus, it is possible to refrain from using a photometer when determining the brightness by means of the camera arrangement.

It has proven to be advantageous, if the brightness reference value is obtained by a calibration method according to the invention.

The preferred embodiments presented with respect to the camera arrangement according to the invention and the advantages thereof correspondingly apply to the methods according to the invention and vice versa.

All of the features and feature combinations mentioned in the description above as well the features and feature combinations mentioned below in the description of the figures and/or shown in the figures alone are usable not only in the respectively specified combination, but also in other combinations or else alone without departing from the scope of the invention.

Figure 2:
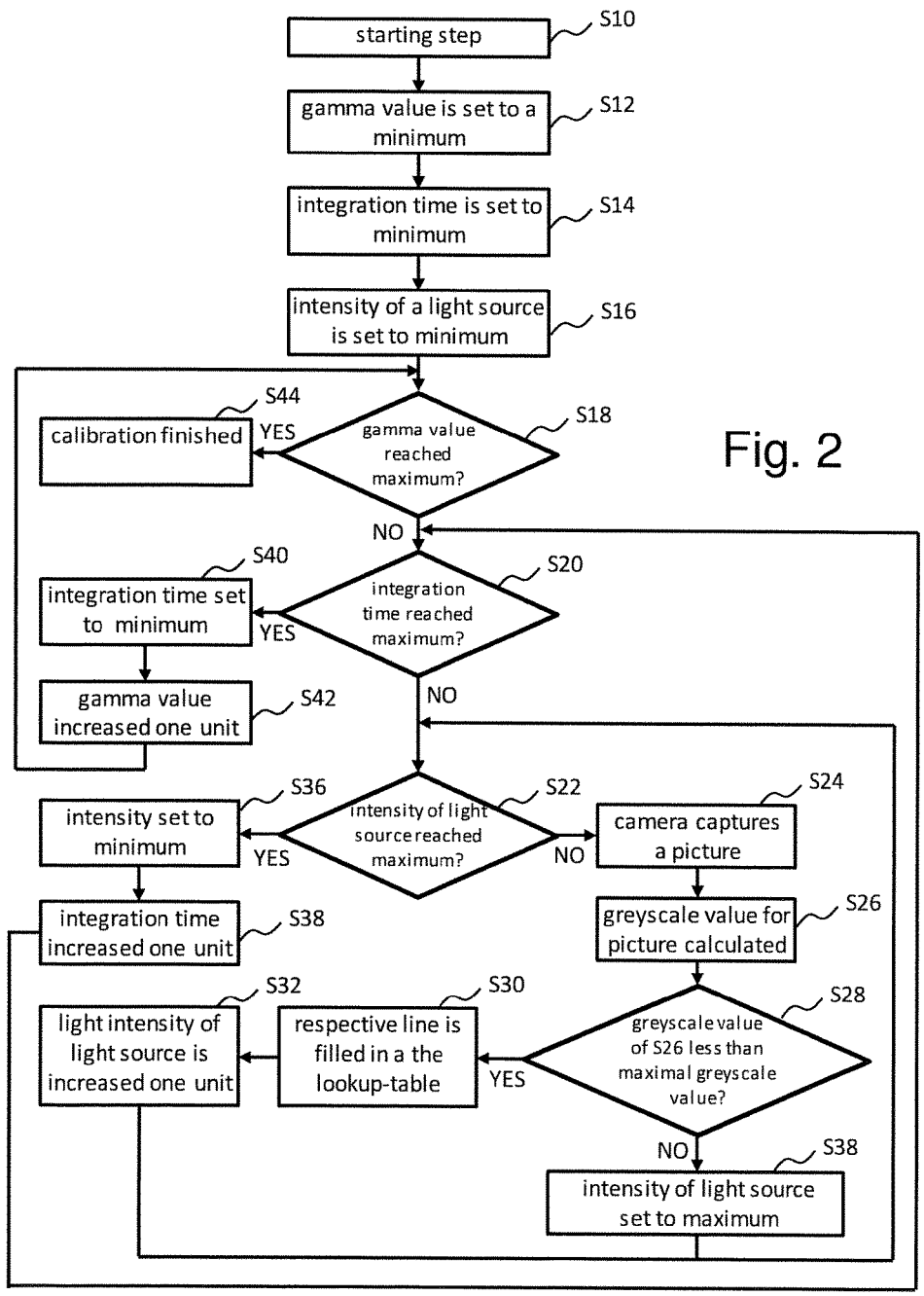

Further advantages, features and details of the invention are apparent from the claims, the following description of preferred embodiments as well as from the drawings. Therein show:

FIG. 1 a calibration device for calibrating a camera for a vehicle with a photometer;

FIG. 2 a flowchart for illustrating the calibration method;

FIG. 3 a flowchart for illustrating the determination of the brightness by means of the calibrated camera; and FIG. 4 very schematically the camera comprising a storage device and an evaluation unit.

FIG. 1 shows a calibration device 10 for calibrating a camera 12 for a vehicle. The camera 12 and a photometer 14 which is arranged next to the camera 12 are arranged in a chamber 16. A diffusion filter 20 is arranged between a light source 18, the camera 12 and the photometer 14 which is located at the same distance from the diffusion filter 20 as the camera 12. The whole backside of the diffusion filter 20 is evenly exposed to the light source 18. The luminous flux 22 emitting from the diffusion filter 20 is homogeneous on the entire surface of the diffusion filter 20, which faces towards the camera 12 and the photometer 14.

The camera 12 can be a black and white camera and in particular comprise a CMOS sensor as picture sensor. The camera 12 can operate according to the VGA standard (VGA=Video Graphics Array). An objective lens of the camera 12 provides for an angle of view of 40°. On the photometer 14 a diaphragm 24 provides for an angle of view of 40° as well. The camera 12 can comprise a filter, which lets wavelengths up to 650 nm pass. A bit-depth of the camera 12 may be 12 bit. Other configurations for the camera 12 and the photometer 14 can be arranged for, provided that their parameters, for instance the number and the size of pixels of the camera 12 as well as of the active surface of the photometer 14 are known.

The photometer 14 comprises a spectral filter so that the light sensitive elements of the photometer 14 only detect those wavelengths which can be perceived by the human eye. The camera 12 which is intended to be used in vehicles, comprises no such spectral filter, so that it can meet other tasks in a better way, for instance detecting road markings, rain or tunnels. Furthermore, the camera 12 can be designed for use at night or when the light conditions are poor.

When the camera 12 and the photometer 14 are exposed to the luminous flux 22 of the light source 18, the photometer 14 indicates the brightness in lux, that is lumen per square meter. The camera 12 captures a luminous flux 22 with a broader spectrum of wavelengths than the light perceivable by the human eye. Therefore from the luminous flux 22 captured by the camera 12 it cannot directly be inferred to the brightness perceivable by the human eye. However, it depends on this brightness, if the camera 12 is to be used to determine whether the vehicle comprising the camera 12 enters a tunnel or if the headlights of the vehicle shall be automatically activated in other circumstances with decreasing brightness.

The photometer 14 comprises optical and numerical correction devices to allow for consideration of the laws of photometry. For instance the spectral filter is provided, and the cosine emission law is taken into consideration when analyzing the signals provided by the photometer 14. Through calibrating the camera 12 with the photometer 14 it is possible to refrain from providing such optical or numerical correction devices. The calibration also allows to ignore certain characteristics of the camera 12, for instance the recording noise, the transmission and the wavelength spectrum which passes through the optical units of the camera 12.

The camera 12 can be parameterized, wherein the integration time as well as the gamma value can be adjusted. The integration time indicates during which time interval the photosensitive cells of the picture sensor of the camera 12 are exposed to the luminous flux 22 in order to generate a certain electrical signal. The dynamic of the cameras' response can be adjusted by setting the gamma value. For instance, a low gamma value results in a quick saturation of the pixels of the camera 12 when the brightness increases.

In the following an exemplary calculation is used to illustrate how the calibration of the camera 12 with the photometer 14 is carried out. With a luminous flux of 4 lumen and an active surface of the photometer 14 of 0.002 $m^2$ the photometer 14 displays a brightness value of 2000 lux. The camera 12 is adjusted to a gamma value of 3 and an integration time of 243 lines. The integration time can be indicated in lines, provided the camera 12 is a line camera, which means that the picture sensor only comprises one light sensitive line. Such a line camera provides, given a predetermined angle of view, a particularly good spatial resolution. Moreover, a line can be read by far more rapidly than an area.

As the camera 12 requires a predetermined time for scanning a line, it is possible to use the integration time expressed in lines to indicate how many times the same line is scanned during capture of a picture. Multiple scanning of the same line is particularly expedient when there are strong differences in brightness within one line, as this avoids a saturation of the light sensitive cells of the picture sensor. Furthermore, it is thus possible to minimize the noise of the signal.

For a pixel of the camera 12 regarded in the exemplary calculation a greyscale value of 1685 is determined. With a surface of a pixel of $3.6*10^{-11}$ $m^2$ and 2000 lux (or 2000 lumen per square meter) this results in $7.2*10^{-8}$ lumen as photometric quantity. This value of the photometric quantity is therefore assigned to the greyscale value of 1685 as corresponding value. As already mentioned, this applies to an integration time of 243 lines and a gamma value of 3. Through varying the integration time, the gamma value and the luminous flux 22 emanating from the light source 18, it is thus possible to assign values in lumen to every greyscale value determined by a pixel of the camera 12.

FIG. 2 is used to illustrate this calibration method. The camera 12 having a bit depth of 12 bit allows a graduation of 4096 greyscale values. The gamma value of the camera 12 can, for instance, be variably adjusted between 0 and 15. The integration time of the camera 12 can be varied between 0 and 486 lines.

During calibration, as shown in FIG. 2, after a starting step S10 the gamma value is set to a minimum in step S12. In step S14 the integration time is set to a minimum and in step S16 the intensity of a light source 18. In step S18 it is checked, whether the gamma value has reached its maximum. If this is not the case, it is checked in step S20, if the integration time has reached its maximum. If this is also not the case, it is checked in step S22, whether the intensity of the light source 18 has reached its maximum. If this is not the case, the camera 12 captures a picture in step S24. In step S26 a greyscale value for the picture is calculated. In the calibration device 10 all pixels of the camera 12 receive the same amount of light, but an average greyscale value is calculated in step S26.

In step S28 it is checked whether the greyscale value obtained in step S26 is less than the maximal greyscale value. If this is the case, a respective line is filled in a the lookup-table 26 (see FIG. 3) in step S30. Afterwards, the light intensity of the light source 18 is increased by one unit in step S32, and the procedure is continued with step S22.

If, however, it is determined in step S28 that the greyscale value has reached its maximum, the intensity of the light source 18 is set to its maximum as well in step S34 and after that it is continued with step S22. Thus, it is determined in step S22 that the light source 18 has reached its maximum intensity, and the intensity is set back to its minimum in step S36.

Following that the integration time is increased by one unit in step S38, for instance by one line or, if the integration time is indicated in milliseconds, by a fraction of a millisecond. Then, the procedure is continued with step S20. When the maximal integration time is reached, the integration time is set back to its minimum in step S40 after step S20. Following that, the gamma value is increased by one unit in step S42 and the procedure is continued with step S18. After reaching the maximum of the gamma value, the calibration is finished with step S44. Then the lookup-table is completely filled in.

The lookup-table 26, of which a part is shown in FIG. 3, can then be used to assign respective values in lumen to the greyscale values determined for each of the pixels of the camera 12. This enables determining the brightness of the surroundings of the camera 12 by using the camera 12.

FIG. 3 is used to illustrate the use of the camera 12 in the vehicle. In order to determine the brightness with the camera 12, the lookup-table 26 provided in a storage device 38 of the camera 12 (see FIG. 4) is accessed. After a starting step S46 adjustable parameters 27 of the camera 12 are checked in step S48, namely the preset gamma value and the preset integration time. Furthermore, a picture is captured in step S48. In step S50 a portion 28 of the lookup-table 26, which is to be focussed on, is delimited with respect to the rest of the lookup-table 26. The preset gamma value and the preset integration time are present in this portion 28 of the lookup-table 26. The gamma values are listed in a first column 30 and the values for possible integration times in a second column 32 of the lookup-table 26.

A greyscale value is determined for each pixel of the camera. Then, in step S52 the determined greyscale value is compared with brightness reference values indicated in greyscale values, which have been obtained in the calibration process beforehand. The brightness reference values are listed in another column 34 of the lookup-table 26. To each greyscale value in column 34 is assigned a corresponding value in lumen which is listed in another column 36 of the lookup-table 26. The corresponding value in lumen has also been obtained during the calibration process described above. Still in Step 52 to a pixel for which a certain greyscale value has been determined the corresponding value in lumen from column 36 is assigned. For instance for a gamma value of 3, an integration time of 240 lines and a greyscale value of 140 a corresponding value in nanolumen of 77 is found in one line within the portion 28 of the lookup-table 26. This applies for a camera with a bit-depth of 8 bit.

To each greyscale value of all the pixels of the picture taken by the camera 12 are assigned the corresponding values in lumen in step S52. Following that, in step S54 the values in lumen, which have been assigned to every single pixel of the picture based on its greyscale value, are summed up. Since the brightness usually is indicated in lumen per square meter, the sum of all values in lumen assigned to each one of the pixels is related to the total surface of all pixels of the camera in step S56. Thus, it is possible to determine the brightness of the camera's surroundings by using the greyscale values provided by the camera. The brightness is indicated in lux.

Even when using a lookup-table which only contains a few data values, it is possible to achieve a good accuracy after calibration of the camera 12 with the photometer 14. For example an average mistake of −9% with a standard deviation of 21% can be obtained by using the calibrated camera 12 to determine the brightness compared to directly using a photometer 14 for determining the brightness. In other words, the calibrated camera 12 gives out a value of 700 lux to 1120 lux for a value of 1000 lux measured by the photometer 14. These results can be ameliorated tremendously, if the lookup-table 26 is completed as mentioned above.

When using the camera 12 in a vehicle, it is thus possible to refrain from using a photometer 14 for tunnel detection, which allows for reduced costs for the camera arrangement comprising the camera 12 and the storage device 38. The camera 12 which enables determining brightness can also be used as rain sensor.

FIG. 4 shows, in a very schematical way, the camera 12, wherein the lookup-table 26 is arranged in a storage device 38 of the camera 12. While operating the camera 12 an evaluation unit 40 of the camera 12 accesses the storage device 38 and thus makes it possible to compare the greyscale values determined by the camera 12 with the brightness reference values stored in column 34 of the lookup-table 26. The evaluation unit 40 also performs the summing up of the corresponding values in lumen assigned to the respective greyscale values and the transformation of the total luminous flux received by the pixels in illuminance, that is in lumen per square meter. The evaluation unit 40 therefore enables to give out the brightness value determined by the camera 12 in lux.

In an alternative camera arrangement the storage device 38 and/or the evaluation unit 40 can be units arranged outside the camera 12, for example in a control unit to which the camera 12 is coupled.

The invention claimed is:

1. A camera arrangement for a vehicle, comprising:
a camera that captures a picture of a surrounding of the vehicle and determines a grayscale value for each pixel from a plurality of pixels of the picture;
a storage device that stores a plurality of reference brightness values previously obtained by a photometer during a calibration process of exposing the camera and a photometer to a same light source, wherein the plurality of reference brightness values are correlated to a plurality of gray scale values obtained by the camera during the calibration process; and
an evaluation unit that compares the grayscale value determined by the camera in the picture with the plurality of gray scale values obtained during the calibration process and stored in the storage device, and determines a reference brightness value corresponding to the grayscale value from the plurality of reference brightness values stored in the storage device,
wherein, during the calibration process, the camera measures grayscale values corresponding to different luminous flux for each pixel from the plurality of pixels of a picture sensor of the camera, and wherein an integration time and a gamma value are set before measuring the grayscale value.

2. The camera arrangement according to claim 1, wherein the camera arrangement determines a brightness of the surrounding of the vehicle by summing the brightness values for each pixel from a plurality of pixels of the picture captured by the camera.

3. The camera arrangement according to claim 2, wherein the reference brightness values correspond to different gamma values of the camera or to different integration times during which a picture sensor of the camera accumulates charge carriers as the camera captures a picture.

4. The camera arrangement according to claim 2, wherein the plurality of reference brightness values which are captured by the photometer during the calibration process and the corresponding grayscale values obtained during the calibration process are stored in a lookup-table provided in the storage device.

5. The camera arrangement according to claim 4, wherein a portion of the lookup-table is pre-determined based on a preset gamma value or a preset integration time of the camera.

6. The camera arrangement according to claim 1, wherein the reference brightness values are indicative of a brightness perceivable by the human eye.

7. The camera arrangement according to claim 1, wherein the reference brightness values are stored as the grayscale values if the camera is a black and white camera.

8. A method for calibrating a camera of a vehicle, comprising:

exposing the camera and a photometer to different luminous flux of a light source;

measuring, using the photometer, reference brightness values of the luminous flux of the light source corresponding to the different luminous flux;

measuring, using the camera, grayscale values corresponding to the different luminous flux for each pixel from a plurality of pixels of a picture sensor of the camera, wherein an integration time and a gamma value are set before measuring the grayscale value; and storing the reference brightness values of the different luminous flux of the light source and the grayscale values of the different luminous flux in a storage device.

9. The method according to claim 8, wherein the reference brightness values and the corresponding grayscale values are stored in a lookup-table provided in the storage device.

10. The method according to claim 8, wherein the camera and the photometer are exposed to the light source simultaneously.

11. The method according claim 8, wherein the camera and the photometer capture respective angles of view of a same quantity.

12. A method for operating a camera arrangement including a camera for a vehicle, the method comprising:

capturing a picture of a surrounding of the vehicle using the camera;

determining a grayscale value for each pixel from a plurality of pixels of the picture;

accessing a storage device of the camera arrangement to retrieve a reference brightness value from a plurality of reference brightness values corresponding to the grayscale value for each pixel from the plurality of pixels, wherein the plurality of reference brightness values are previously obtained by a photometer during a calibration process of exposing the camera and the photometer to a same light source, and wherein the plurality of reference brightness values are correlated to the plurality of gray scale values obtained during the calibration process;

summing the reference brightness values corresponding to the grayscale values for the plurality of pixels; and determining the sum of the reference brightness values as the brightness of the surrounding of the vehicle, wherein, during the calibration process, the camera measures grayscale values corresponding to different luminous flux for each pixel from the plurality of pixels of a picture sensor of the camera, and wherein an integration time and a gamma value are set before measuring the grayscale value.

* * * * *